May 4, 1937. A. M. BROSIUS 2,079,063
LIQUID FLOW CONTROL
Filed Oct. 11, 1933  2 Sheets-Sheet 1
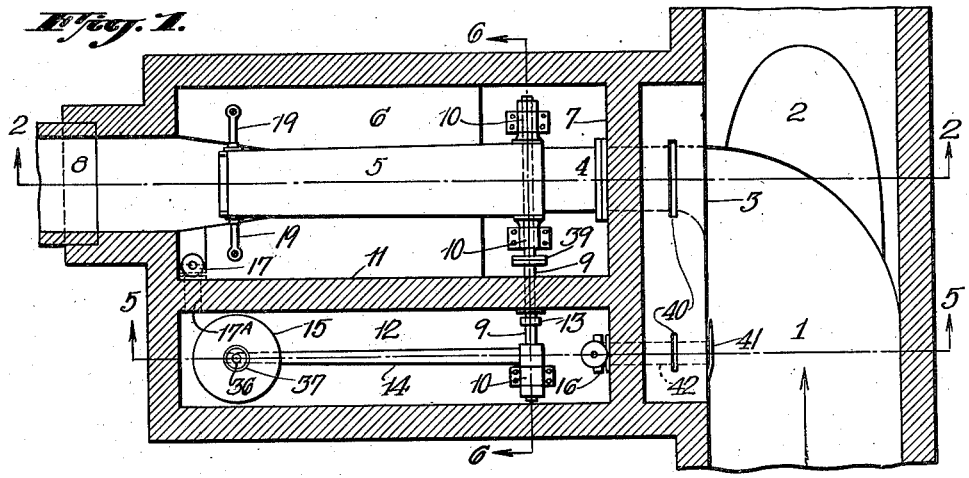
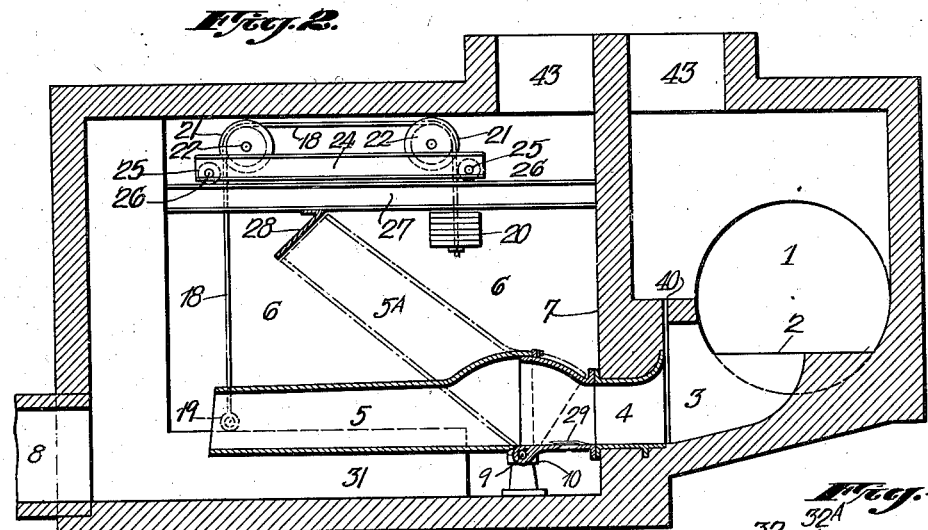
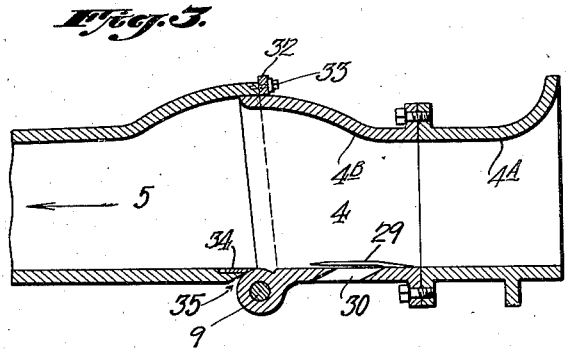
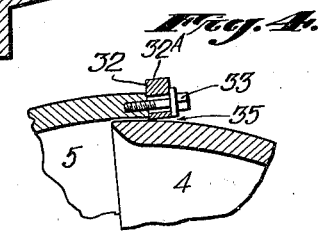
INVENTOR
ALBERT M. BROSIUS.
BY
Joseph V. Meigs
ATTORNEY

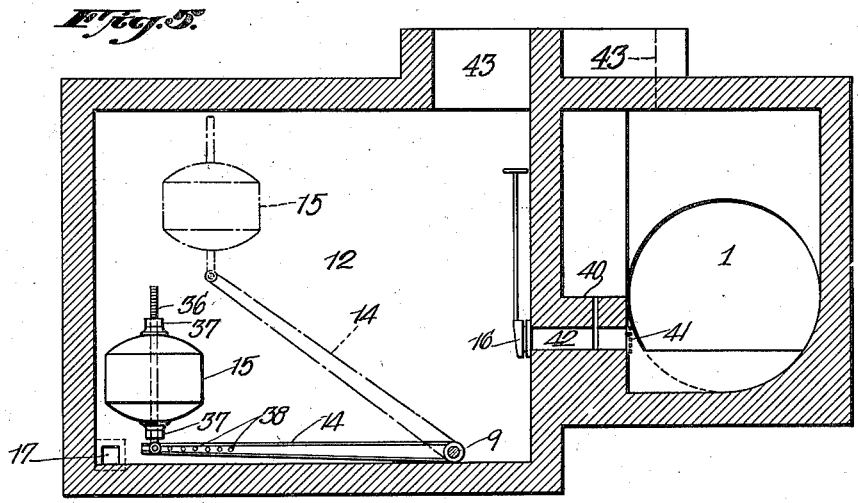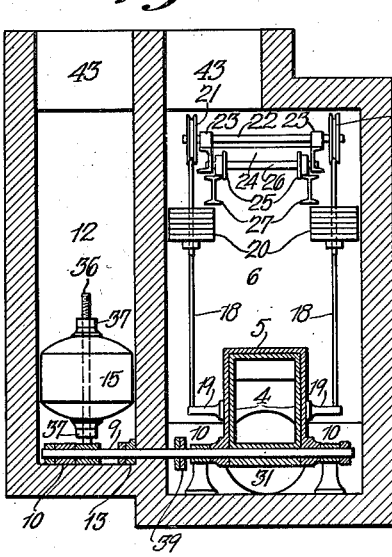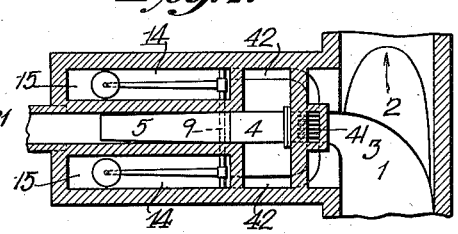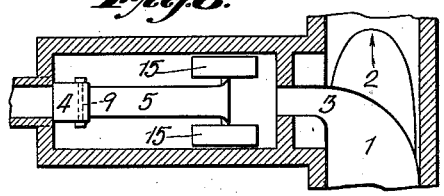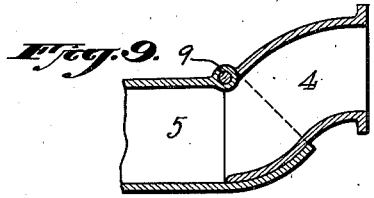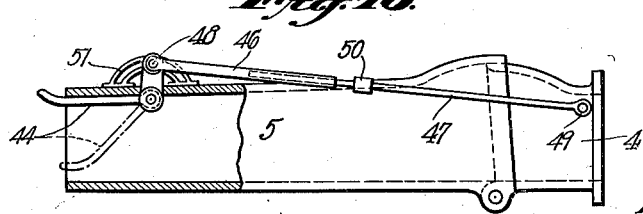

Patented May 4, 1937

2,079,063

UNITED STATES PATENT OFFICE 2,079,063

LIQUID FLOW CONTROL

Albert M. Brosius, White Plains, N. Y.

Application October 11, 1933, Serial No. 693,097

19 Claims. (Cl. 137—78)

The present invention relates to method and apparatus for controlling the flow of liquids.

One of the principal problems involved in public health work is the proper disposal of sewage and industrial wastes. Sewage disposal plants are designed and equipped to handle certain maximum quantities thereof and if quantities in excess thereof are delivered to such plants, the excess cannot be disposed of in a sanitary manner and must be gotten rid of as an emergency problem as for example by discharging into flowing streams or the ocean. Also excess flow may cause expensive upsetting of the process, such as throwing activated sludge plants out of proper operation. This necessarily causes a health hazard which is extremely undesirable and dangerous especially in congested centers of population. It is therefore important to have suitable and dependable means for delivering to a sewage disposal plant a constant maximum flow. Even though the apparatus designed to produce such constant flow operates satisfactorily in theory it is impractical unless it can be depended upon at all times to deliver not more than the maximum quantity intended.

It is one object of the present invention to provide an improved method and apparatus for attaining a constant maximum flow.

Another object is to provide a method and apparatus so rugged in construction and free from complications that it can be safely depended upon at all times.

Another object is to provide economy in the construction, installation and maintenance of such apparatus.

Another object is to provide an improved method and apparatus for producing a constant rate of flow of liquid diverted from the principal body thereof for purposes other than those concerned specifically with the problem of sewage and waste disposal, e. g. the diversion of a constant quantity of liquid from rivers, lakes, forebays and the like for the development of power and for water supply and for other purposes, the rate of diverted flow being constant irrespective of fluctuations of the head or level of liquid of the body from which diversion is effected.

Another object is to provide a constant feed for any liquid where a steady controllable input is desired, such as in chemical works.

Other objects and advantages will be apparent from the following more detailed description in which certain specific embodiments of the invention will be described in connection with the accompanying drawings. It is intended and will be understood that the invention is illustrated by but not limited to these specific embodiments.

Fig. 1 represents a transverse sectional plan view of an apparatus adapted particularly to control the flow of sewage to a desired point.

Fig. 2 is vertical sectional view taken on the line 2—2, Fig. 1.

Fig. 3 is an enlarged sectional view of a portion of the conduits 4 and 5.

Fig. 4 is an enlarged fragmentary view of the sliding joint shown in Figures 2 and 3.

Fig. 5 is a vertical sectional view taken on the line 5—5, Fig. 1.

Fig. 6 is a vertical sectional view taken on the line 6—6, Fig. 1.

Figures 7 and 8 are respectively horizontal sectional views of modified forms of the invention.

Fig. 9 is a sectional fragmentary view of a modified form of sliding joint or seal which may be used instead of the one illustrated in Fig. 2.

Fig. 10 represents automatic means for controlling the size of the orifice in the conduit or tube which controls the flow of liquid.

In general, like parts are designated by the same numerals.

In Fig. 1 the arrow at the right of the figure indicates the direction of flow of liquid as for example sewage in the conduit 1 containing a diversion weir 2, which in some cases might be replaced by a sump or depression in the bottom of the conduit. The purpose of the weir 2 is to divert a portion of the flow in the main conduit into the converging channel 3. From this channel the diverted flow enters the stationary part indicated generally as 4, of a hinged tube and flows through the same to the movable part 5 of that tube. The stationary part 4 of the tube may be securely fixed in the wall 7 of the tube chamber 6. The movable portion 5 of the tube which, as will be explained, rises and falls in the tube chamber 6 and discharges the diverted flow into effluent conduit 8 leading from the tube chamber 6 to a predetermined locus of disposal (not shown). The movable part 5 may be securely fixed to the shaft 9 which rotates in the stationary part of the tube and in the bearings 10. The shaft 9 extends through the partition wall 11 which separates the tube chamber 6 from a float chamber 12. A stuffing box 13 is provided to prevent leakage from the float chamber into the tube chamber. Securely fastened to the shaft 9 in the float chamber 12 is the lever 14 which is attached to the float 15. A gate 16 controls communication between the float chamber 12 and conduit 1 through the channel 42. A somewhat similar gate or valve 17 is provided to control flow of liquid from the float chamber 12 into the tube chamber 6 through the pipe or channel 17A. When the gate 16 is open and the gate or valve 17 is closed or partly closed the liquid from the conduit 1 enters the float chamber 12 through the valve or gate 16. The surface of the liquid in the conduit and in the float chamber will then be substantially at the same elevation. Consequently the float 15 rises and falls as the elevation of the surface of liquid in the main conduit 1 increases or decreases. This change in the surface elevation of liquid in the main conduit is due to the varying volume of flow in the conduit. As the float 15 rises or falls the corresponding motion is transmitted by the lever 14 and shaft 9 to the movable part 5 of the hinged tube thereby causing the free end of the tube 5 to be raised or lowered correspondingly. The height of the diversion weir 2 or the depth of the sump (where a sump is provided instead of a weir) is such as to provide a hydraulic head on the free end of the hinged tube when the latter is in a horizontal position sufficient to provide a predetermined rate of flow of liquid which it is desired to divert from the main conduit. When the volume of flow in the main conduit is greater than the quantity to be diverted, the liquid in the main conduit overflows the weir and the surplus quantity passes down the main conduit. Under such conditions the surface elevation of the liquid in the main conduit increases causing a corresponding rise of the surface of the liquid in the float chamber 12 which is in communication with the liquid in the main conduit through the channel 42. The float 15 therefore rises thereby elevating the free end of the movable part of the hinged tube 5 in the float chamber 6. In this manner a constant differential is maintained between the surface elevation of the liquid in the main conduit and the free end of the tube 5 so that a constant hydraulic head is maintained and a constant and predetermined rate of flow of liquid occurs through the tube 5.

Referring now more especially to Figures 1, 2 and 6, the movable part 5 of the hinged tube is shown in Fig. 2 in two positions, one a horizontal position 5 drawn in full lines and the other an elevated position 5A drawn in dotted lines. Cables 18 are attached to the free end of the tube 5 by means of the arms 19 which are of such length that the counterweights 20 will clear the sides of the tube 5 when the counterweights move downwardly while the tube 5 is rising. The cables 18 pass over the pulleys 21 which revolve on axles 22. The axles 22 turn in bearings 23 which are supported on the frame or carriage 24. The carriage 24 is provided with wheels 25 which revolve on axles 26 and which wheels run on rails 27 suitably supported as shown in Fig. 2. Since the carriage is free to move along the rails 27 the cable 18 will always preserve a vertical direction from the arms 19 to the pulleys above them. The lifting power of the counterweights 20 will therefore exert a uniform pull on the free end of tube 5 regardless of the particular position the tube may assume due to the buoyancy of the float 15 acting through the lever 14 and the shaft 9. In addition to, or instead of connecting the counterweights to the hinged tube by the method described above, weights may be attached to levers connected to the shaft 9, said levers extending in opposite directions from the movable portion 5 of the hinged tube or of the float lever 14. Such weights would counteract the weight of the tube and of the liquid contained therein. The system of levers and method of applying the same, as described above, may be changed to any other arrangement which will accomplish the purpose of the invention. In some cases it may be desirable to entirely cut off the flow through the tube 5A when the latter has been elevated to a predetermined position and in such an event an adjustable plate 28 may be provided to register with the end of the tube 5A when the latter has reached said position. Said plate 28 may be supported as shown in Fig. 2 by the rails 27.

Referring now more especially to Figures 3 and 4 for a description of the hinged or sliding joint between the fixed and movable portions 4 and 5 respectively of the hinged tube, the stationary portion, indicated generally by 4, for construction and repair purposes may preferably be made in two parts i. e. the wall casting 4A and the part 4B the latter which forms part of the hinge. These two parts 4A and 4B are securely joined by bolts or other suitable means so that they may be taken apart. In the bottom of the part 4B a bar screen 29 is placed over an opening 30 in order to permit a small quantity of liquid to escape in order that the channel 31 shown in Figures 2 and 6 may be flushed out to prevent an accumulation therein of objectionable matter. The bar screen comprises small bars fixed at their up-stream ends (the arrow in Fig. 3 indicating the direction of flow) and free and pointed at their down-stream ends. The opening 30 may extend across the entire width of the tube.

Adjustable seals indicated generally at 32 and 34 may be provided, which seals may be fitted to the top, sides and bottom of the hinged tube at the joint thereof to take up wear and insure reasonable tightness. Figure 4 indicates an enlarged fragmentary view of the seal 32 on the top of the hinged tube. This seal may consist of a strip of metal 32A attached to the end of the movable portion 5 of the tube. This strip 32A may be provided with oblong holes and held in position by screws 33 passing through the oblong holes and entering the end of the movable portion of the tube. This arrangement permits moving the strip 32A closer to the stationary part of the tube to take up wear thereby giving a reasonably tight joint. The sealing strips 32A and 34 may be bevelled in such a manner that there is only one line of contact between the strip and the stationary part of the tube thereby providing wedge-shaped spaces 35. The wedge-shaped spaces 35 thus formed prevent small particles of grit from lodging in the joint for if such particles should pass the line of contact they would not remain in the widening wedge-shaped spaces between but would be carried out of the joint by the small flow of liquid which would also pass the line of contact. In the manner indicated wear on the joint may be reduced to a minimum.

Referring now more especially to Figures 1, 5 and 6 the lever 14 and the float 15 are shown in two positions, one horizontal shown by full lines and the other by dotted lines. The float 15 may be attached to the lever 14 by adjustable connections including a threaded rod 36 attached to the lever and passing through the float. The rod 36 is held in position in relation to the float by means of two nuts 37 which when turned in the same direction move the float either up or down on the rod. In this manner the float may be brought closer to or farther away from the lever. When the float is close to the lever the hydraulic head on the free end of the movable part 5 of the hinged tube will be less and when the float is farther away from the lever the hydraulic head on the free end of the tube will be greater. As shown more particularly in Fig. 5 the effective length of the lever arm with respect to the float may be adjusted by connection to any desired one of the holes 38. When the float is at the outer end of the lever as shown in Fig. 5, the hydraulic head on the free end of the tube is constant for whatever position the tube may assume. By shortening the effective length of the lever arm with respect to the float 15 the height to which the float 15 must be raised to produce the same angular movement of the lever arm, and consequently the same change in the hydraulic head, is decreased. The lever may be longer than shown in Fig. 5, so that its effective length may be greater than that of the tube. When such is the case, the hydraulic head on the free end of the tube increases as it is raised by the float.

Referring now more especially to Figures 1, 2 and 5 it will be noted that stop planks or slide gates 40 may be provided by means of which the flow from the main conduit 1 to the tube chamber 6 and/or float chamber 12 may be shut off when it is necessary to make repairs or adjustments to the apparatus or for other purposes. A bar screen 41 may also be provided over the inlet end of the connecting channel 42 between the main conduit 1 and the float chamber 12 to prevent large particles of matter from entering the float chamber. This bar screen consists of small bars fixed at their up-stream ends and free and pointed at their down-stream ends so that the bars will not collect matter on them but will be kept clean by the flowing liquid which sweeps past them. Manholes 43 may also be provided to afford access to the main conduit and to the tube and float chambers from the street or ground surfaces.

Referring now more especially to Figures 7 and 8, Fig. 7 shows a form of structure in which dual or twin float chambers are used instead of the single float chamber previously illustrated and described. In Fig. 7 communication between the liquid in the main conduit and that in the float chambers is not direct as shown in Figures 1, 2 and 5. Instead, an aperture is provided in the top of the stationary portion of the hinged tube and from this aperture provided with bar screen 41 separating channels 42 lead to their respective float chamber 14. The liquid from the converging channel 3 is thus divided into three parts. One of these flows through the hinged tube (4 and 5). The other two parts flow respectively through channels 42 into the corresponding float chambers 14 containing floats 15. The movable portion 5 is raised and lowered by the motion of the floats communicated to the tube respectively by the levers 14 and shaft 9.

Figure 8 represents and is illustrative of a modified embodiment of the invention. Here the effluent end 4 of the hinged tube is fixed instead of movable, as illustrated in the other figures. The movable portion 5 is joined to the fixed portion 4 by the joint 9. The end of the movable portion 5 is flared as shown and is provided with fixed floats 15. The apparatus thus shown is enclosed within a float chamber in communication with the diversion channel 3 which diverts liquid from the principal conduit 1 in which flow of liquid over the diversion weir 2 occurs in the direction of the arrow. Floats 15 are so designed with respect to buoyancy and the weight of tube 5 that the flared open end of the tube 5 is at all times kept partially submerged. The cross sectional area of the tube 5 being fixed, the rate of flow of liquid therethrough depends upon the extent to which the bell-mouth of the tube 5 is partially submerged. This rate of flow is independent of the height or level of liquid in the float chamber provided that level does not rise so high as to completely fill the chamber and completely submerge the open flared or bell-mouth of the tube 5.

Figure 9 represents a modified form of joint between the fixed portion 4 and the movable portion 5 of the hinged tube in which as shown the bearing surface between the fixed and movable portions is located on the bottom instead of the top of the tube.

In some cases it may be desirable to regulate the size of the discharge or effluent end or orifice of the movable tube 5 when the latter has attained a predetermined position. Figure 10 illustrates means by which this may be accomplished. A movable closure or gate 44 is pivoted on and is operated by a crank 45 to which in turn by means of pin 48 is connected a tube 46. Rod 47 containing adjustable stop 50 is pivoted on the fixed portion 4 at the pin 49 and telescopes within the tube 46 as shown. When the movable tube 5 attains a predetermined vertical position, further vertical movement will bring the tube 46 into contact with the stop 50 and thereby effect a partial or complete closure of the effluent end of the tube 5 by the gate 44 depending upon the position in which the stop 50 is placed. The extension of the pin 47 may move within the arcuate slot 51 to which it may be securely clamped, so that the gate 44 may be set in any desired position. The stop 50 may then be so placed that it will not come in contact with tube 46.

In carrying out the method of my invention with the specific apparatus illustrated let it be assumed that the flow of sewage or other liquid through the conduit 1 is insufficient to overflow the weir 2. The movable tube 5 is then placed in a horizontal position and will divert to a locus of disposal all the liquid flowing through the main conduit 1, the hydraulic head or gradient being the mean difference between the center of the stream through the tube 5 and the level of liquid in the principal conduit. Such a condition is prevalent in municipalities in the early hours of the morning. Subsequently and later in the day the flow of liquid in the principal conduit may be sufficient to attain the height of the diversion weir 2 in which case the flow of liquid through the conduit 5 will increase. That rate of flow however represents the maximum rate of flow which should occur through the hinged tube 4—5, and which the disposal plant is capable of taking care of. Let it then be supposed that for any reason the volume flow of sewage or waste increases as for example by the occurrence of a storm. The level of liquid in the principal conduit 1 then rises and overflows the diversion weir. According to the invention described the same level of liquid is maintained in a control reservoir 12 of substantially quiescent liquid which is in hydraulic communication with the main body of liquid in the conduit 1. Furthermore, a fixed and cooperative relation is maintained between the level of liquid in the control reservoir 12 and the discharge or effluent end of the conduit 5 so that regardless of change in the level of liquid in the control reservoir 12 and conduit 1 the same hydraulic gradient or head is maintained between the point of discharge of the liquid through the effluent end of the conduit 5 and the level of liquid in the control reservoir 12.

Particular means by which this fixed cooperative relationship may be maintained are illustrated in the embodiments herein described. These specific means comprise, as already described, the float 15, the lever 14, shaft 9 and the rigid movable tube 5 as well as the counterweights 20 communicating with the fixed tube 5 through the cables 18. Other specific means for maintaining this fixed cooperative relationship may be employed. For example although a rigid conduit 5 is provided, a flexible conduit might be employed.

This aspect of the invention therefore falls within the method of diverting a controlled and constant proportion of liquid from a principal body thereof to a predetermined locus of disposal which comprises diverting said liquid from the main body thereof in a confined stream through the conduit 5 which has a predetermined cross sectional area, discharging this confined stream at a level (for example that illustrated in Fig. 2 when the conduit 5 is in a horizontal position) located a predetermined distance below the level of the principal body of liquid, maintaining a control reservoir such as 12 of quiescent liquid in hydraulic communication with a main body of liquid (as for example through the gate 16, channel 42 and bar screen 41), and maintaining a fixed, predetermined and cooperative relation between the point of discharge of said confined stream from the conduit 5 and the surface of liquid in the control reservoir 12, whereby the hydraulic gradient between the point of discharge of the confined stream from the conduit 5 and the surface of liquid in the control reservoir 12 (and principal body of liquid in the conduit 1) remains constant and whereby a constant rate of flow occurs in the confined stream irrespective of the level of liquid in the principal body thereof.

What I claim is:

1. In flow control apparatus comprising a diversion conduit having an influent and an effluent end, the former during operation being in communication with a principal body of liquid the level of which is subject to fluctuation from which body of liquid diversion is to be effected at a substantially constant predetermined hydraulic gradient, in combination; counterweight means to assist in raising and lowering said effluent end to maintain a constant hydraulic gradient between said end and the above mentioned liquid level comprising; a carriage mounted to roll horizontally in a predetermined path; at least two pulleys rotatably mounted on said carriage and spaced horizontally from each other; a flexible strand supported by said pulleys; one end of said strand being connected to the effluent end of said diversion conduit and the other end supporting a counterweight.

2. In a system of the type described including a fluctuating main body of liquid, the combination comprising a liquid chamber having inlet and outlet openings in the wall thereof below the normal level of the main body of liquid, a float chamber having an inlet opening below the normal level of and communicating with the main body of liquid independently of the communication of said body with said liquid chamber and a drain opening in the wall thereof communicating with said liquid chamber, a conduit pivotally mounted at one end in the fluid chamber, the fixed end of the conduit communicating with the inlet opening in the wall of the chamber, a float in the float chamber, and means connecting the float to the conduit for tilting the conduit in accordance with fluctuations in the level of the fluid in the float chamber.

3. In a system of the type described including a fluctuating main body of liquid, the combination comprising a liquid chamber having inlet and outlet openings in the wall thereof below the normal level of the main body of liquid, a float chamber having an inlet opening below the normal level of and communicating with the main body of liquid and a drain opening in the wall thereof communicating with said liquid chamber, a conduit pivotally mounted at one end in the fluid chamber, the fixed end of the conduit communicating with the inlet opening in the wall of the chamber, a float in the float chamber, means connecting the float to the conduit for tilting the conduit in accordance with fluctuations in the level of the fluid in the float chamber, and means for closing the free end of the conduit when the fluid in the float chamber has reached a predetermined level.

4. The method of diverting a constant flow of liquid from a fluctuating main body of said liquid retained within a confining wall which comprises discharging a restricted portion of said liquid from a fixed opening in said wall directly into the fixed inlet of a confined branch course (said opening and inlet being entirely below the surface of said liquid and in direct communication) the outlet of which branch course is movable in a substantially vertical plane, moving said outlet in a substantially vertical plane while keeping said inlet in its fixed position, corresponding to changes in the level of said main body of liquid to preserve constant the hydraulic head between the liquid level in said main body and that discharged from said outlet.

5. The method of diverting a constant flow of sewage liquid which comprises flowing a main body of said liquid in the form of a stream in its predetermined course, discharging a restricted portion of said sewage liquid from a fixed opening entirely below the surface of said liquid (while continuing the flow of the main body in its predetermined course) directly into the fixed inlet of a confined branch course, said inlet being also below the surface of said liquid, which branch course is movable in a substantially vertical plane, moving said outlet in said substantially vertical plane, while keeping said inlet in its fixed position, corresponding to changes in the level of said main flowing body of sewage to preserve constant the hydraulic head between the level of sewage in said main body and that discharged from said outlet.

6. The method of diverting a constant flow of sewage liquid which comprises flowing a main body of said liquid in the form of a straight-line stream in its predetermined course, discharging a restricted portion of said sewage liquid from a fixed opening entirely below the surface of said liquid (while continuing the flow of the main body in its predetermined course) directly into the fixed inlet of a confined branch course leading off at an angle from said predetermined course, which branch course is movable in a substantially vertical plane intersecting the line of the stream at an angle therewith, moving said branch course in said substantially vertical plane while keeping said inlet in its fixed position, corresponding to changes in the level of said main flowing body of sewage to preserve constant the hydraulic head between the level of sewage in said main body and that discharged from said outlet.

7. The method of diverting a constant flow of sewage liquid which comprises flowing a main body of said liquid in the form of a stream in its predetermined course, discharging a restricted portion of said sewage liquid from a fixed opening entirely below the surface of said liquid (while continuing the flow of the main body in its predetermined course) directly into the fixed inlet of a confined branch course which branch course is movable in a substantially vertical plane intersecting the line of the stream at an angle of substantially not less than ninety degrees between said plane and said line looking downstream toward said plane, moving said branch course in said vertical plane, while keeping said inlet in its fixed position, corresponding to changes in the level of said main flowing body of sewage to preserve constant the hydraulic head between the level of sewage in said main body and that discharged from said outlet.

8. Flow control apparatus comprising a principal channel through which liquid flows at fluctuating levels during the operation thereof and means to withdraw liquid at a uniform maximum rate of flow irrespective of fluctuations in the level of liquid in said principal channel, through an opening of predetermined and constant cross section at a predetermined and constant hydraulic head, comprising a branch conduit having an influent and effluent end, said conduit leading off from said main channel at an angle therewith to permit liquid not withdrawn through said branch conduit to continue on its course in said principal channel, the influent end of said branch conduit being in fixed and direct communication with said main channel through an opening in the wall thereof at a point below the level of liquid therein, and the effluent end thereof being capable of up-and-down movement in consonance with fluctuations of the level of liquid in said principal channel, and means to raise and lower said effluent end to maintain a substantially constant and predetermined hydraulic head between said effluent end and the liquid level in said principal channel.

9. Flow control apparatus comprising a principal channel through which liquid flows at fluctuating levels during the operation thereof and means to withdraw liquid at a uniform maximum rate of flow irrespective of fluctuations in the level of liquid in said principal channel, through an opening of predetermined and constant cross section at a predetermined and constant hydraulic head, comprising a branch conduit having an influent and effluent end, said conduit leading off from said main channel at an angle therewith to permit liquid not withdrawn through said branch conduit to continue on its course in said principal channel, the influent end of said branch conduit being in direct communication with said main channel through an opening in the wall thereof at a point below the level of liquid therein, and the effluent end thereof being capable of up-and-down movement in consonance with fluctuations of the level of liquid in said principal channel, and means to raise and lower said effluent end to maintain a substantially constant and predetermined hydraulic head between said effluent end and the liquid level in said principal channel comprising a float chamber connected to the principal channel in parallel with said branch conduit, a float in said chamber responsive to fluctuations of liquid level in said main channel and connections between said float and said branch conduit.

10. Flow control apparatus comprising separate chambers each independently connected with a principal channel through which liquid is adapted to flow at fluctuating levels therein, a diversion conduit in one chamber having an inlet communicating directly with said principal channel at a point below the level of liquid therein, said conduit being mounted at its inlet end to rotate in a vertical plane whereby its outlet end can be raised or lowered in consonance with fluctuations in the liquid level in said principal channel, and means in the other chamber responsive to said fluctuations to cause said conduit to rotate and maintain a substantially constant and predetermined difference in level between the outlet end of the conduit and the liquid level in said principal channel.

11. Flow control apparatus comprising branch chambers independently connected, in parallel, with a principal channel, a branch conduit in one chamber having an influent and an effluent end and being rotatably mounted at the influent end thereof to rotate in a substantially vertical plane, a second conduit in said chamber connecting said branch conduit with an opening in said principal channel at a point below the level of liquid therein during operation thereof, telescopic, substantially liquid-tight connection between said branch conduit and said second conduit in said chamber, and means in said other branch chamber, responsive to fluctuations in the level of liquid in said principal chamber, to raise and lower said branch conduit to maintain substantially constant the hydraulic head between the effluent end of said branch conduit and the liquid level in said principal channel.

12. Flow control apparatus comprising branch chambers independently connected, in parallel, with a principal channel, a branch conduit in one chamber having an influent and an effluent end and being rotatably mounted at the influent end thereof to rotate in a substantially vertical plane, a second conduit in said chamber connecting said branch conduit with an opening in said principal channel at a point below the level of liquid therein during operation thereof, the axes of said conduits in said chamber lying substantially in the same straight line, telescopic, substantially liquid-tight connection between said branch conduit and said second conduit in said chamber, and means in said other branch chamber, responsive to fluctuations in the level of liquid in said principal chamber, to raise and lower said branch conduit to maintain substantially constant the hydraulic head between the effluent end of said branch conduit and the liquid level in said principal chamber.

13. A branch conduit for diverting sewage liquid from a principal conduit said branch conduit comprising a rotatably mounted portion and a fixed portion, means to cause the said respective portions, by rotation of the rotatably mounted portion, to slide and partially telescope upon each other, and adjustable sealing means to maintain substantially liquid-tight connection between the sliding parts comprising a member adjustably mounted on one portion for sliding contact with the other portion, said member being adjustable to compensate for wear.

14. A branch conduit for diverting sewage liquid from a principal conduit, said branch conduit comprising a rotatably mounted portion and a fixed portion, the axes of said conduits lying substantially in the same straight line, means to cause the said respective portions, by rotation of the rotatably mounted portion, to slide and partially telescope upon each other, and adjustable sealing means to maintain substantially liquid-tight connection between the said sliding parts.

15. Flow control apparatus for withdrawing liquid from a principal channel comprising a diversion conduit connected to said principal channel said conduit having an influent and effluent end, and means to preserve a constant hydraulic head between said affluent end and the level of liquid in said principal channel, including a float chamber and an inlet from said principal channel to said float chamber, said inlet being provided with a screen comprising a plurality of rods extending across said inlet, each rod being substantially parallel to the axis of the principal channel and being secured at its up-stream end to the wall of the principal channel, the down-stream end being free and pointed, said screen thereby being substantially self-cleaning.

16. Flow control apparatus comprising a principal conduit defined in part at least by a retaining wall, an opening in said wall from which liquid tends to flow out of the conduit, during operation of the apparatus, in a substantially straight line and means to divert, out of said opening in said substantially straight line, a substantially constant flow irrespective of fluctuation of the level of liquid in said principal conduit comprising a branch conduit, the longitudinal axis of which lies substantially in said above mentioned straight line, said conduit having an influent and an effluent end, said influent end being in communication with said opening in the principal channel and means to raise and lower said effluent end in consonance with fluctuations in the level of liquid in said principal channel to maintain a substantially constant hydraulic head between the liquid flowing from the effluent end of said branch conduit and the liquid level in said principal channel.

17. Flow control apparatus comprising a principal conduit defined in part at least by a retaining wall, an opening in said wall from which liquid tends to flow out of the conduit, during operation of the apparatus, in a substantially straight line at an angle to the longitudinal axis of the principal conduit, and means to divert, out of said opening in said substantially straight line, a substantially constant flow irrespective of fluctuation of the level of liquid in said principal conduit comprising a branch conduit the longitudinal axis of which lies substantially in said above mentioned straight line, said conduit having an influent and an effluent end, said influent end being in fixed communication with said opening in the principal channel and means to raise and lower said effluent end in consonance with fluctuations in the level of liquid in said principal channel to maintain a substantially constant hydraulic head between the liquid flowing from the effluent end of said branch conduit and the liquid level in said principal channel.

18. Flow control apparatus comprising a principal conduit in which during operation sewage liquid flows in a predetermined course said conduit being defined in part at least by a retaining wall, an opening in said wall from which liquid tends to flow out of the conduit, during operation of the apparatus, in a substantially straight line lying in a plane which intersects the longitudinal axis of the principal conduit at an angle, and means to divert, out of said opening in said substantially straight line, a substantially constant flow irrespective of fluctuation of the level of liquid in said principal conduit comprising a branch conduit the longitudinal axis of which lies substantially in said above mentioned straight line, said conduit having an influent and an effluent end said influent end being in communication with said opening in the principal channel and means to raise and lower said effluent end in consonance with fluctuations in the level of liquid in said principal channel to maintain a substantially constant hydraulic head between the liquid flowing from the effluent end of said branch conduit and the liquid level in said principal channel.

19. Flow control apparatus comprising a principal conduit in which during operation sewage liquid flows in a predetermined course in the direction of the longitudinal axis of said conduit which conduit is defined in part at least by a retaining wall, an opening in said wall from which sewage liquid tends to flow out of the conduit, during operation of the apparatus, in a substantially straight line lying in a plane which intersects the longitudinal axis of the principal conduit at an angle of not substantially less than ninety degrees between said plane and the longitudinal axis of the principal conduit looking downstream in the latter, and means to divert, out of said opening in said substantially straight line, a substantially constant flow irrespective of fluctuation of the level of liquid in said principal conduit comprising a branch conduit, the longitudinal axis of which branch conduit lies substantially in said above mentioned straight line, said conduit having an influent and an effluent end, said influent end being in communication with said opening in the principal channel, and means to raise and lower said effluent end in consonance with fluctuations in the level of liquid in said principal channel to maintain a substantially constant hydraulic head between the liquid flowing from the effluent end of said branch conduit and the liquid level in said principal channel.

ALBERT M. BROSIUS.